United States Patent Office 3,661,923
Patented May 9, 1972

3,661,923
POLYFUNCTIONAL POLYOL ESTER
OXAZOLIDINES
William D. Emmons, Huntingdon Valley, and Jerome
F. Levy, Dresher, Pa., assignors to Rohm and Haas
Company, Philadelphia, Pa.
No Drawing. Filed Oct. 18, 1968, Ser. No. 768,906
Int. Cl. C07d 85/26
U.S. Cl. 260—307 F       8 Claims

ABSTRACT OF THE DISCLOSURE

Polyfunctional polyol ester oxazolidines of the general formula

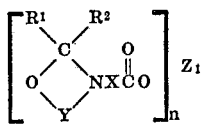

where
$n$ is an integer of two to four;
$Z_1$ is an alkylene radical or a tri- or tetravalent hydrocarbon radical
X is the radical

where $m$ is an integer of 2 to 4 and $R^5$ and $R^6$ are selected from H and $(C_1-C_6)$alkyl or a mixture thereof;
$R^1$ and $R^2$ are selected from the group consisting of
(1) separate groups selected individually from
(a) hydrogen, phenyl, benzyl, and $(C_1-C_{12})$alkyl groups in the case of $R^1$ and
(b) hydrogen and $(C_1-C_4)$alkyl groups in the case of $R^2$ and
(2) a single group selected from the group consisting of pentamethylene and tetramethylene which together with the carbon atom to which the group is atached forms a carbocyclic group;
Y is the radical

where $m'$ is an integer of 2 to 3 and $R^3$ and $R^4$ are selected from H, $(C_1-C_{12})$alkyl, aryl and alkaryl, produced by means of a transesterification process are useful for formulating adhesives, caulks, lacquers, paints, varnishes, leather impregnants and moisture-cured coating systems.

This invention relates to new compounds which may be generally referred to as polyfunctional polyol ester oxazolidines and to novel intermediate oxazolidines formed in the preparation thereof. It also relates to their polymers, the preparation of the monomers and their polymers, and novel monomers and polymers derived therefrom.

For the most part, monofunctional oxazolidines and derivatives thereof have been used as stabilizers for rapid-curing resin solutions, and in adhesive systems. The prior art bis-ozazolidine is generally characterized by a fused-ring structure having a single nitrogen atom common to both rings. Some fused-ring bis-oxazolidines have been used in coating systems. The general method for producing these bis-oxazolidines was to react two moles of formaldehyde with one mole of a polyhydric aminohydroxy compound such as tris(hydroxymethyl)aminomethane.

This reaction is represented in the prior art as follows:

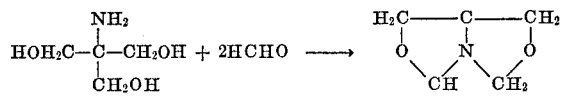

The preparation of monofuctional N-hydroxyalkyloxazoliidines is known in the art. In general, they are prepared by reaction of the di(hydroxyalkyl)amines with ketones or aldehydes in bulk or within an inert solvent such as xylene, benzene, or toluene, adapted to form an azeotrope with the water to aid in its removal. The mixture is heated to a temperature of 100° C. or higher depending on the pressure in order to distill water.

The novel polyfunctional polyol ester oxazolidines of this invention are those having the formula

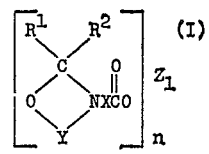

where
$n$ is an integer of two to four;
$Z_1$ is an alkylene radical or a tri- or tetravalent hydrocarbon radical
X is the radical

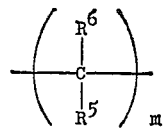

where $m$ is an integer of 2 to 4 and $R^5$ and $R^6$ are selected from H and $(C_1-C_6)$alkyl or a mixture thereof;
$R^1$ and $R^2$ are selected from the group consisting of
(1) separate groups selected individually from
(a) hydrogen, phenyl, benzyl, and $(C_1-C_{12})$alkyl groups in the case of $R^1$ and
(b) hydrogen and $(C_1-C_4)$alkyl groups in the case of $R^2$ and
(2) a single group selected from the group consisting of pentamethylene and tetramethylene which together with the carbon atom to which the group is attached forms a carbocyclic group;

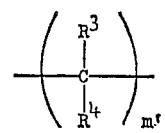

where $m'$ is an integer of 2 to 3 and $R^3$ and $R^4$ are selected from H, $(C_1-C_{12})$alkyl, aryl and alkaryl.

Compounds of Formula I may be produced by reacting and oxazolidine, described below, having ester functionality with a saturated or ethylenically unsaturated polyol which may contain aryl groups such as phenylene, etc. to effect the transesterification of the oxazolidine. The starting oxazolidine used in the transesterification reaction may be produced in a Michael addition reaction wherein an oxazolidine, is reacted with an ester of an $\alpha,\beta$-ethylenically unsaturated carboxylic acid to form a Michael addition product which is the oxazolidinyl propionate ester. Alternatively, a primary alkanolamine is reacted with an ester of $\alpha,\beta$-ethylenically unsaturated carboxylic acid to form a Michael addition product. The Michael addition product is then further reacted with an appropriate carbonyl compound, such as an aldehyde or ketone, to produce a monofunctional oxazolidine having ester functionality. For example, when an acrylate ester is used as the starting material in the Michael addition reaction, the Michael addition product is a β-substituted propionate ester. The novel intermediate oxazolidine formed by reacting the Michael addition product with the appropriate carbonyl compound is of the general formula (II) 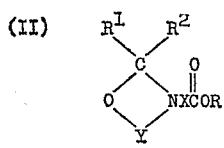

where R is $(C_1-C_{18})$alkyl, cycloalkyl, aryl, aralkyl and alkaryl.

The starting oxazolidine used in the transesterification reaction may also be prepared by allowing (1) an oxazolidine, (2) a compound capable of reacting as an oxazolidine, or (3) a compound capable of being converted under the reaction conditions to an oxazolidine to react with the appropriate ester of an unsaturated carboxylic acid, such as an ester of acrylic acid. For example, formaldehyde and ethanolamine react to form a product which may not be an oxazolidine but which is tautomeric with the oxazolidine, or a polymer thereof. This product reacts with an ester of acrylic acid to form oxazolidinylpropionate esters. Isobutyraldehyde and ethanolamine react to form an equilibrium mixture of the oxazolidine and the hydroxyethylimine which on reaction with esters of acrylic acid also form oxazolidinylpropionate esters. As an alternative to providing compounds of Formula I by transesterification of simple oxazolidine esters with polyols, esters of acrylic acid with polyols can be reacted either with oxazolidines, or compounds capable of being converted to oxazolidines under the reaction conditions as indicated above for the simple esters.

The transesterification reaction may, if desired, be base catalyzed. Suitable basic catalysts would include sodium salts of phenols such as sodium phenoxide, p-hydroxydiphenylamine or a tetraalkyl titanate, such as the tetraisopropyl or tetrabutyl titanate. If the reaction is effected under alkaline conditions using a tetralkyl titanate as the catalyst, then about one-half percent to about ten percent, preferably one to five percent by weight of the titanate based on the weight of the oxazolidine is used. No solvent is needed. The starting materials may be used in stoichiometrically equivalent amounts, however, the ester may be used in an excess amount. The alcohol liberated during the transesterification is removed by azeotropic distillation of a mixture of the alcohol and the starting monomeric polyester. The reaction is generally carried out at temperatures of about 50° to about 180° C. and the completion of the reaction may be determined by measuring the amount of alcohol removed. The theoretical amount of alcohol that should be liberated out of the system by distillation is readily calculated.

Basic metal hydroxides may also be used as the transesterification catalyst. They may be used in the amount of from about 0.2% to about 5% and preferably from about 1 to about 3% based on the weight of the starting oxazolidine. Sodium methoxide or ethoxide as well as the potassium and lithium analogs may be used. An illustrative transesterification reaction would involve mixing of a starting oxazolidine and a polyol with a solution of the alkoxide in an alcohol such as methanol. The alkoxide solution may be added gradually to the polyol-oxazolidine mixture. No additional solvent is needed. The temperature may be from 50° to about 180° C. and preferably not over 160° C.

The following reaction sequence, in which ethanolamine and methyl acrylate are used for illustrative purposes only, is illustrative of this invention:

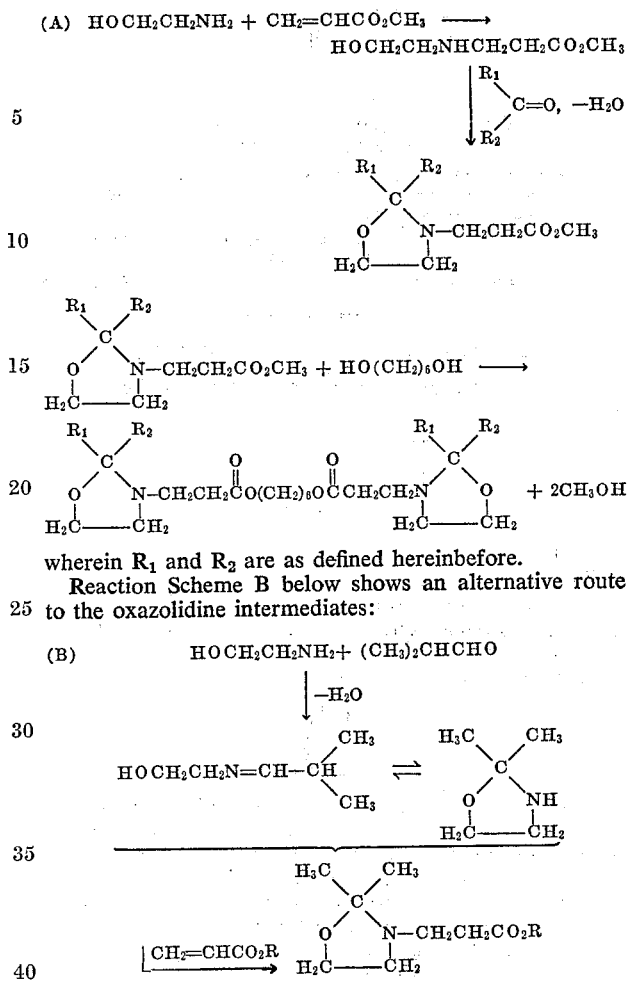

wherein $R_1$ and $R_2$ are as defined hereinbefore.

Reaction Scheme B below shows an alternative route to the oxazolidine intermediates:

The polyfunctional oxazolidines of this invention are weak bases having no active hydrogen and in effect they are blocked non-reactive amines. However, the compounds of this invention become highly reactive when they are hydrolyzed by exposure to atmospheric moisture to produce a strong base having both amine and hydroxyl functionality. In addition those polyfunctional oxazolidines having ethylenically unsaturated bonds may be polymerized either alone or with other copolymerizable materials forming coatings, impregnants, adhesives for textiles, leather, wood and metals, as well as binding agents for pigments, fibers and non-woven fabrics.

Representative of some of the poly(oxazolidine) esters of Formula I are ethylene glycol bis-oxazolidinyl propionate, 1,4-butylene glycol bis-oxazolidinyl propionate, ethylene glycol bis-isopropyloxazolidinyl propionate, butylene glycol bis-isopropyloxazolidinyl propionate, trimethylolpropane tris-isopropyloxazolidinyl propionate, lauryl-oxazolidinyl propionate and pentaerythritol tetra-isopropyloxazolidinyl propionate.

The poly(oxazolidine)esters of this invention may be mixed with electrophilic reagents, such as organic isocyanates, containing at least two isocyanate groups, in the presence of moisture at ambient or elevated temperatures to produce a coating system characterized by a hard, tough film.

The solubility characteristics of the compounds of Formula I can be predetermined by careful selection of the appropriate carbonyl compound used in the formation of the intermediate oxazolidine. Representative of the carbonyl compounds that may be used in this invention are formaldehyde, acetone, acetaldehyde, methyl ethyl ketone, propionaldehyde, methyl propyl ketone, butyraldehyde, methyl isobutyl ketone, benzaldehyde, methyl isopropyl ketone, cyclopentanone, diisobutyl ketone, and cyclohexanone. It has been found that polyfunctional oxazolidines derived from starting oxazolidines based on formaldehyde and isobutyraldehyde are excellent starting materials for the electrophilic quenching reaction used to produce the moisture-cured coating systems described above. The moisture-cured oxazolidine coating systems are the subject of a companion application, Ser. No. 7,270, filed on Jan. 30, 1970 by William D. Emmons entitled "Hydrocurable Oxazolidine-Isocyanate Compositions," and assigned to a common assignee.

Representative polyols that may be used in the transesterification reaction are those which contain at least two hydroxyl groups and are substantially free from other functional groups containing active hydrogen. Illustrative polyols include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene-oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be used include glycerol, trimethylolethane, ethylene glycol, propylene glycol, trimethylolpropane, 1,2,6 - hexanetriol, pentaerythritol, sorbitol, glycosides, such as methyl, ethyl, propyl, butyl and 2-ethylhexyl arabinoside, xyloside, fructoside, glucoside, rhammoside, etc., and the polyethers prepared therefrom by reaction with ethylene oxide, propylene oxide, butylene oxide, or mixtures thereof such as, for example, the alkylene oxide adduct of sucrose:

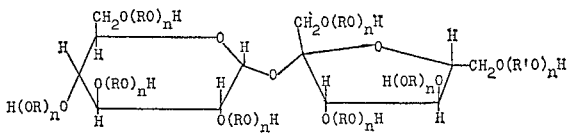

wherein R' is ethylene, propylene, butylene, or mixtures thereof and $n$ is an integer such that the average molecular weight of the polyether is 200 and higher.

Further included as polyols are the mononuclear polyhydroxybenzenes such as resorcinol, pyragallol, phlorglucinol, hydroquinone, 4,6-di-t-butylcatechol, catechol, orcinol, methylphloroglucinol, 2,5,6-trimethylresorcinol, 4-ethyl-5,6-dimethylresorcinol, n-hexylresorcinol, 4-chloro-5-methylresorcinol, and the like; fused ring systems such as 3-hydroxy-2-naphthol, 6,7-dihydroxy-1-naphthol, 2-hydroxyl-1-naphthol, 2,5-dihydroxy-1-naphthol, 9,10-dihydroxyanthracene, 2,3-dihydroxyphenanthrene, etc. and the polyethers prepared therefrom by reaction with a 1,2-alkylene oxide such as ethylene, propylene or butylene oxide.

Other polyols which can be employed are polynuclear hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p - hydroxyphenyl)methane and the various diphenols and diphenylol methanes disclosed in U.S. Pats. 2,506,486 and 2,744,882, respectively.

Exemplary triphenylol compounds which can be employed include the alpha,alpha,omega,tris(hydroxyphenyl)alkanes such as 1,1,2-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propanes;
1,1,3-tris(hydroxy-2,5-dimethylphenyl)propanes;
1,1,3-tris(hydroxy-2,6-dimethylphenyl)propanes;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes,
and the like.

Tetraphenylol compounds include the alpha,alpha, omega,omega,tetrakis(hydroxyphenyl)alkanes such as 1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;
and the like.

To assist those skilled in the art to practice this invention the following modes of operation are suggested by way of illustration, parts and percentages being by weight unless otherwise specifically noted.

All boiling points are in degrees centigrade unless otherwise stated.

EXAMPLE 1

Preparation of 2-isopropyl-1,3-oxazolidine

A 2,000-ml., 3-necked, round-bottomed flask was fitted with a mechanical stirrer, an addition funnel and a Dean-Stark water separator. The flask was charged with 360 g. (5.0 moles) of isobutyraldehyde. Then 305 g. (5.0 moles) of 2-aminoethanol was added over a period of one hour while cooling the flask in cold water. Then 300 ml. of benzene was added and the mixture was heated to reflux to azeotrope off water. After 4 hr., 92 ml. of water (theory, 90 g.) had been collected and the product was fractionated through a ten-plate efficiency Oldershaw column. Yield of main cut, B.P. 55–60 (13 mm.), was 457.6 g. (79%).

According to the infrared and NMR spectra, the product is a mixture of the oxazolidine and its tautomeric form, the isobutyraldehyde imine of ethanolamine.

Analysis.—Calc'd for $C_6H_{13}NO$ (percent): C, 62.57; H, 11.38; N, 12.16. Found (percent): C, 62.29; H, 11.27; N, 11.76.

The product will hereafter be referred to as 2-isopropyloxazolidine, even though its exists in more than one automeric form.

EXAMPLE 2

Preparation of "1,3-oxazolidine"

A 1-l., 3-necked, round-bottom flask was fitted with a mechanical stirrer, an addition funnel and a Dean-Stark water separator. The flask was charged with 413 g. (5.0 moles) of 37% aqueous formaldehyde solution. With cooling, 305 g. (5.0 moles) of 2-aminoethanol was added slowly. Then 75 ml. of benzene was charged and the reaction mixture was heated to reflux to azeotrope out water. After approximately 11 hr. of reflux, the benzene was stripped out and the product was distilled. Boiling point fluctuated widely during the distillation, B.P. 87–105° (1.5–2.0 mm.). The yield was 238 g. (65%).

*Analysis.*—Calc'd for $C_3H_7NO$: basic N, 19.17%. Found: Basic N, 18.62%.

The distillate, if collected in a Dry-Ice cooled vessel, is a slightly viscous liquid which on standing and warming to room temperature undergoes a strongly exothermic change to a viscous liquid. This is probably a polymerization or oligomerization reaction as the viscous liquid can be redistilled, but requires a large input of heat to do so, presumably because of the necessity to "crack-back" to a smaller unit. The exact structure of the product or products are not known with certainty although the product mixture will henceforth be referred to as "oxazolidine." It is probably a polymer or oligomer of oxazolidine or some tautomer of oxazolidine. Monomeric oxazolidine prepared according to the teachings of P. A. Laurent, "Compte Rendue Acad. Sc. Paris," 261, pages 1323–1326, Aug. 2, 1965, can be used in place of the above material in subsequent examples.

EXAMPLE 3

Preparation of methyl 3-(1,3-oxazolidin-3-yl)propionate

This example illustrates the preparation of an oxazolidinylalkanoate ester by Michael type addition of an oxazolidine, or oxazolidine tautomer to an α,β-unsaturated ester.

A mixture of 14.6 g. (0.20 eq.) of oxazolidine, 17.2 g. (0.20 eq.) of methyl acrylate, 0.10 g. of polymerization inhibitor (monomethyl ether of hydroquinone), and 0.10 g. of lithium chloride were dissolved in 15 ml. of methanol and allowed to stand at room temperature for 6 days. The product, isolated by distillation, B.P. 122° (2.0 mm.), weight 3.5 g. Infrared and nuclear magnetic resonance (NMR) spectra of the product are practically identical with spectra of authentic material, prepared as described in Example 4.

EXAMPLE 4

Preparation of methyl 3-(1,3-oxazolidin-3-yl)propionate

A 500-ml., 3-necked, round-bottomed flask was fitted with a mechanical stirrer, a Dean-Stark water separator and a dropping funnel. The flask was charged with 61.1 g. (1.0 mole) of 2-aminoethanol and 0.1 g. of polymerization inhibitor (monomethyl ether of hydroquinone). Then, with cooling in ice 86.1 g. (1.0 mole) of methyl acrylate was added slowly. After stirring at about 40–50° for 35 min., 33 g. (1.0 mole) of 91% paraformaldehyde and 100 ml. of benzene were added and the mixture was heated to reflux to azeotrope out water. After 2.5 hr. of refluxing, 20.2 ml. of aqueous phase had been collected (theory, 18.0 g.) and the product was isolated by distillation. Yield of product boiling 75–80° (1.1 mm.) was 113.2 g. (71%).

*Analysis.*—Calc'd for $C_7H_{13}NO_3$ (percent): C, 52.81; H, 8.23; N, 8.80. Found (percent): C, 52.78; H, 8.23; N, 8.80.

EXAMPLE 5

Preparation of methyl 3-(2-isopropyl-1,3-oxazolidin-3-yl) propionate

Using approximately the same procedure of Example 4 was prepared methyl 3-(2-isopropyl-1,3-oxazolidin-3-yl)-propionate from methyl acrylate, ethanolamine and isobutyraldehyde. The same product may be prepared from 2-isopropyl-1,3-oxazolidine and methyl acrylate.

*Analysis.*—Calc'd for $C_{10}H_{19}NO_3$ (percent): C, 59.70; H, 9.45; N, 6.96. Found (percent): C, 58.86; H, 9.44; N, 6.62.

EXAMPLE 6

Preparation of lauryl 3-(1,3-oxazolidin-3-yl)-propionate

This example illustrates the transesterification of an alcohol with a lower alkyl ester of an oxazolidinylpropionic acid.

A 500-ml., 3-necked, round-bottomed flask was fitted with a mechanical stirrer, a thermometer, and a short Vigreux column with a distillation head. The outlet from the still head was attached to a trap cooled in Dry Ice. The flask was charged with 186 g. (1.0 mole) of lauryl alcohol, 79.5 g. (0.50 mole) of methyl 3-(1,3-oxazolidin-3-yl)-propionate and 0.5 g. of a 25% solution of sodium methoxide. The system was placed under vacuum (25 mm.) and the mixture was heated to 120°. After ½ hour, 23 g. of condensate had been collected in the trap. The reaction mixture was filtered through charcoal and isolated by distillation, B.P. 170–190° (2 mm.). The yield was 113 g. (73%).

Titration with 0.1 N perchloric acid in acetic acid solvent gave an equivalent weight of 350.9 g./eq. (theory, 313.5 g./eq.). This indicates that the material is 89% pure. Thin layer chromatography revealed the absence of any methyl 3-(1,3-oxazolidin-3-yl)propionate.

EXAMPLE 7

Preparation of 1,4-butylene bis-[3-(2-isopropyl-1,3-oxazolidin-3-yl)propionate]

In a manner similar to that described in Example 6, 322.0 g. (1.60 mole) of methyl 3-(2-isopropyl-1,3-oxazolidin-3-yl)propionate was transesterified at 75–100° (125–135 mm.) with 63.1 g. (0.70 mole) of 1,4-butanediol using a total of 10 ml. of 25% methanolic sodium methoxide as catalyst added gradually.

The product was freed of most of the excess methyl 3-(2-isopropyl-1,3-oxazolidin-3-yl)propionate by heating at 112° under reduced pressure (0.1–0.25 mm.). The material at this point was thixotropic, giving gel-like appearance until the alkoxide catalyst was removed by filtration through diatomaceous earth and charcoal. The product was distilled through a wiped film still at a wall temperature of 300° C. (0.3 mm.) to provide approximately 250 g. of the desired 1,4-butylene glycol bis-ester of isopropyl-oxazolidinylpropionic acid (81% yield).

*Analysis.*—Calc'd for $C_{22}H_{40}N_2O_6$: C, 61.7%; H, 9.4%; N, 6.54%; eq. wt., 214.3. Found: C, 62.19%; H, 9.51%; N, 6.37%; eq. wt. (titration), 222.

EXAMPLE 8

Preparation of the tris-[3-(2-isopropyl-1,3-oxazolidin-3-yl)-propionate]ester of trimethylolpropane In a manner similar to that described in Example 6, 60.3 g. (0.30 mole) of methyl 3-(2-isopropyl-1,3-oxazolidin-3-yl)propionate was transesterified with 13.4 g. (0.10 mole) of 2-ethyl-2-(hydroxymethyl)-1,3-propanediol at 85° (10 mm.) using 1.0 g. of 25% methanolic sodium methoxide. In two hours, 9.8 g. of methanol had been collected. Remaining volatiles were stripped off at 120° (0.5 mm.) to yield the product as a pale yellow syrup. The product was characterized by means of its infrared spectrum which showed only a trace of hydroxyl absorption at 2.88μ and strong ester absorption at 5.83μ. Titration with 0.1 N aqueous hydrochloric acid gave an equivalent weight of 236 g./eq. (theory, 215.0 g./eq.) indicating a purity of 91%.

EXAMPLE 9

Preparation of 1,2-ethylene bis-[3-(1,3-oxazolidin-3-yl)-propionate]

By the transesterification procedure typified by Examples 6–9 was prepared 1,2-ethylene bis-[3-(1,3-oxazolidin-3-yl)propionate] from ethylene glycol and methyl 3-(1,3-oxazolidin-3-yl)propionate. The same bis-oxazolidine was prepared by the reaction of 1,2-ethylene bis-acrylate first with ethanolamine and then with formaldehyde as was used in Example 4. The product, after being freed of unreacted starting materials by distillation, shows the expected carbonyl absorption at 5.8μ in the infrared spectrum.

In further examples of the invention, phenyl 3-(1,3-oxazolidin-3-yl)propionate and stearyl 3-(1,3-oxazolidin-3-yl)propionate can be prepared.

What is claimed is:
1. A compound of the formula

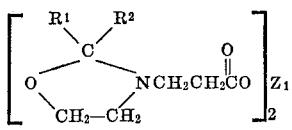

wherein
$R^1$ and $R^2$ are selected from the group consisting of
(1) separate groups selected individually from
(a) hydrogen, phenyl, benzyl, and ($C_1$–$C_{12}$)alkyl groups in the case of $R^1$ and
(b) hydrogen and ($C_1$–$C_4$)alkyl groups in the case of $R^2$ and
(2) a single group selected from the group consisting of pentamethylene and tetramethylene which together with the carbon atom to which the group is attached forms a carbocyclic group;
and $Z_1$ is a ($C_1$–$C_{10}$)alkylene radical.

2. A compound of the formula

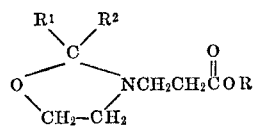

wherein
$R^1$ and $R^2$ are selected from the group consisting of
(1) separate groups selected individually from
(a) hydrogen, phenyl, benzyl, and ($C_1$–$C_{12}$)alkyl groups in the case of $R^1$ and
(b) hydrogen and ($C_1$–$C_4$)alkyl groups in the case of $R^2$ and
(2) a single group selected from the group consisting of pentamethylene and tetramethylene which together with the carbon atom to which the group is attached forms a carbocyclic group;
and R is a ($C_1$–$C_{18}$)alkyl group or a phenyl group.

3. A compound as defined in claim 2 wherein said compound is methyl 3-(1,3-oxazolidin-3-yl)propionate.

4. A compound as defined in claim 2 wherein said compound is methyl 3-(2-isopropyl-1,3-oxazolidin-3-yl)propionate.

5. A compound as defined in claim 2 wherein said compound is phenyl 3-(1,3-oxazolidin-3-yl)propionate.

6. A compound as defined in claim 2 wherein said compound is stearyl 3-(1,3-oxazolidin-3-yl)propionate.

7. A compound as defined in claim 2 wherein said compound is lauryl 3-(1,3-oxazolidin-3-yl)propionate.

8. A compound as defined in claim 2 wherein R is ($C_1$ to $C_{18}$)alkyl.

References Cited
UNITED STATES PATENTS 2,920,075 1/1960 Melamed _____ 260—244
3,281,310 10/1966 Danielson _____ 161—227

OTHER REFERENCES

Wagner et al.: "Synthetic Organic Chemistry," Wiley, New York (1963), p. 673.

ALEX MAZEL, Primary Examiner

R. V. RUSH, Assistant Examiner

U.S. Cl. X.R.

106—33; 252—8.57; 260—45.8, 88.3, 244 R, 246